United States Patent [19]

Braun et al.

[11] Patent Number: 5,045,231

[45] Date of Patent: Sep. 3, 1991

[54] AQUEOUS DISPERSIONS OF ORGANOPOLYSILOXANES

[75] Inventors: Rudolf Braun, Kastl; Karl Braunsperger, Burghausen; Herbert Söllradl, Emmerting; Matthias Wolfgruber, Burghausen, all of Fed. Rep. of Germany

[73] Assignee: Wacker-Chemie GmbH, Munich, Fed. Rep. of Germany

[21] Appl. No.: 587,820

[22] Filed: Sep. 24, 1990

[30] Foreign Application Priority Data

Sep. 26, 1989 [DE] Fed. Rep. of Germany ....... 3932025

[51] Int. Cl.$^5$ .............................................. B01J 13/00
[52] U.S. Cl. ............................ 252/315.1; 252/315.01; 252/312; 524/859; 524/860
[58] Field of Search ................ 252/315.01, 315.1, 312; 524/860, 859

[56] References Cited

U.S. PATENT DOCUMENTS

| | | | |
|---|---|---|---|
| 4,090,015 | 5/1978 | Koyanagi et al. | 526/62 |
| 4,318,743 | 3/1988 | Blasko et al. | 106/84 |
| 4,319,936 | 3/1982 | Nowakowski et al. | 106/74 |
| 4,762,879 | 8/1988 | Letoffe et al. | 524/720 |
| 4,769,405 | 9/1988 | Kondo et al. | 524/35 |
| 4,806,592 | 2/1989 | Saruyama | 524/860 |
| 4,929,702 | 5/1990 | Cavezzan et al. | 528/18 |
| 4,978,704 | 12/1990 | Perrin | 524/404 |
| 4,990,556 | 2/1991 | Shimizu et al. | 524/475 |

*Primary Examiner*—Robert L. Stoll
*Assistant Examiner*—Nina Bhat

[57] ABSTRACT

Aqueous dispersions of organopolysiloxanes containing the following components:
- (A) Organopolysiloxane having groups which can undergo condensation;
- (B) condensation catalyst;
- (C) organopolysiloxane resin; and
- (D) diorganosilanolate and/or condensation products thereof formed by splitting off water.

18 Claims, No Drawings

AQUEOUS DISPERSIONS OF ORGANOPOLYSILOXANES

The invention relates to organopolysiloxanes and more particularly to aqueous dispersions of organopolysiloxanes which, after removal of water, can be converted into elastomers. The invention also relates to processes for preparing and using the same.

BACKGROUND OF THE INVENTION

Environmental protection measures increasingly necessitate the avoidance of organic solvents in chemical formulations. Aqueous systems are accordingly being used more and more.

Aqueous dispersions of organopolysiloxanes are known per se. For example, the preparation of aqueous silicone dispersions based on hydroxylated diorganopolysiloxane, colloidal silicon dioxide and an organic amine or sodium hydroxide is described in U.S. Pat. No. 4,221,688 (R. D. Johnson, Dow Corning Corporation; published on 9th Sept. 1980).

Aqueous silicone dispersions which are obtained by addition of an alkali metal silicate to an anionically stabilized aqueous emulsion of polydiorganosiloxane having hydroxyl end groups are known from U.S. Pat. No. 4,244,849 (J.C. Saam, Dow Corning Corporation; published on 13th Jan. 1981). Aqueous dispersions which contain siliconate in addition to the polydiorganosiloxanes having hydroxyl groups in the terminal units and (organo)metallic compounds are described in U.S. Pat. No. 4,816,506 (N. Gamon, Wacker-Chemie GmbH; published on 28th Mar. 1989).

Therefore, it is an object of the present invention to provide aqueous organopolysiloxane dispersions which are stable and ready-to-use without a long storage time. A further object of the present invention is to provide aqueous organopolysiloxane dispersions which form elastomers having different mechanical properties in a relatively simple manner and within a short time.

SUMMARY OF THE INVENTION

The foregoing objects and others which are apparent from the following description are accomplished in accordance with this invention, generally speaking, by providing aqueous dispersions of organopolysiloxanes containing the following components:

(A) Organopolysiloxane having groups which can undergo condensation;
(B) condensation catalyst;
(C) organopolysiloxane resin; and
(D) diorganosilanolate and/or condensation products thereof formed by splitting off water.

DETAILED DESCRIPTION OF THE INVENTION

The organopolysiloxanes (A) which contain groups which can undergo condensation and are employed in the present invention are preferably those of the formula

wherein R can be the same or different and represents a hydrogen atom or an alkyl radical having from 1 to 6 carbon atoms(s), $R^1$ represents the same or different hydrocarbon radicals having from 1 to 18 carbon atom(s), which are optionally substituted by halogen atoms, amino groups, ether groups, ester groups, epoxy groups, mercapto groups, cyano groups or (poly)glycol radicals, in which the (poly)glycol radicals contain oxyethylene and/or oxypropylene units, and n is an integer of at least 200.

Examples of hydrocarbon radicals represented by $R^1$ are alkyl radicals, such as the methyl, ethyl, n-propyl, isopropyl, 1-n-butyl, 2-n-butyl, iso-butyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such as the n-octyl radical and iso-octyl radicals such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radical; alkaryl radicals, such as o-, m- and p-tolyl radicals, xylyl radicals and ethylphenyl radicals; and aralkyl radicals, such as the benzyl radical and the α- and the β-phenylethyl radical.

Examples of substituted hydrocarbon radicals represented by $R^1$ are halogenated radicals, such as the 3-chloropropyl radical, the 3,3,3-trifluoropropyl radical, chlorophenyl radicals and hexafluoropropyl radicals, such as the 1-trifluoromethyl-2,2,2-trifluoroethyl radical; the 2-(perfluorohexyl)ethyl radical, the 1,1,2,2-tetrafluoroethoxypropyl radical, the 1-trifluoromethyl-2,2,2-trifluoroethoxypropyl radical, the perfluoroisopropoxyethyl radical and the perfluoroisopropoxypropyl radical; radicals substituted by amino groups, such as the N-(2-aminoethyl)-3 aminopropyl radical, the 3-aminopropyl radical and the 3-(cyclohexylamino)propyl radical; radicals containing the ether function, such as the 3-methoxypropyl radical and the 3-ethoxypropyl radical; radicals containing the cyano function, such as the 2-cyanoethyl radical; radicals containing the ester function, such as the methacryloxypropyl radical; radicals containing the epoxy function, such as the glycidoxypropyl radical, and radicals containing the sulphur function, such as the 3-mercaptopropyl radical.

Preferred radicals represented by $R^1$ are hydrocarbon radicals having from 1 to 10 carbon atom(s), more preferably at least 80 percent, and more preferably at least 90 percent, of the radicals represented by $R^1$ are methyl radicals.

Preferred radicals represented by R are the hydrogen atom and alkyl groups having from 1 to 4 carbon atom(s), with the hydrogen atom and methyl and ethyl radicals being particularly preferred.

The average value for the number n in formula (I) is preferably chosen so that the organopolysiloxane of the formula (I) has a viscosity of more than 1000 mPa.s, and more preferably more than 10,000 mPa,S at 25° C.

Although not shown in formula (I), up to 10 mol percent of the diorganosiloxane units can be replaced by other siloxane units; however, these are usually present as impurities such as $R^1{}_3SiO_{\frac{1}{2}}-$, $R^1SiO_{3/2}-$ and $SiO_{4/2}-$units which are difficult to avoid during preparation of the polydiorganosiloxanes, wherein $R^1$ is the same as above.

The polydiorganosiloxanes of formula (I) are either emulsified directly or prepared as an emulsion by processes known in the art, for example, by polymerization or condensation of low molecular weight cyclic or linear organopolysiloxanes blocked by hydroxyl and/or alkoxy end groups.

Reference may be made here, for example, to U.S. Pat. No. 4,544,187 (W. Grape, Bayer AG; published on 19th Nov. 1985) and GB-PS 2,056,473 (R. D. Johnson, Dow Corning Corporation; published on 25th May 1983).

The organopolysiloxane (A) which contains groups that can undergo condensation and is employed in this invention can also be polymer structural units in organosilicon copolymers or the constituent of a mixture with at least one organic polymer. Examples of these are mixtures of organopolysiloxane with organic thermoplastic polymers according to U.S. Pat. No. 4,211,729 (K. Marquart, Consortium f elektrochemische Industrie GmbH; published on 9th July 1980).

The organopolysiloxane (A) which contains groups that can undergo condensation and is employed according to this invention can be a single type or a mixture of at least two types of such organopolysiloxanes which contain groups which can undergo condensation.

The condensation catalysts (B) employed in this invention are preferably (organo)metallic compounds, such as, for example, the salts of carboxylic acids, the alcoholates and the halides of the metals Pb, Zn, Zr, Ti, Sb, Fe, Cd, Sn, Ba, Ca and Mn. Particularly preferred catalysts are (organo)tin compounds of carboxylic acids having from 1 to 18 carbon atom(s) and (organo)tin halides, in particular organotin octoates, naphthenates, hexoates, laurates, acetates, bromides and chlorides.

Examples of such (organo)tin compounds are tin(II) octoate, dibutyltin dilaurate, octyltin triacetate, dioctyltin dioctoate, dioctyltin diacetate, didecyltin diacetate, dibutyltin diacetate, dibutyltin dibromide, dioctyltin dilaurate and trioctyltin acetate. Especially preferred compounds are diorganotin dicarboxylate, in particular dibutyltin dilaurate, dioctyltin dilaurate, dibutyltin diacetate and dioctyltin diacetate.

The condensation catalyst (B) employed in this invention can be a single type or a mixture of at least two types of such condensation catalysts.

The aqueous organopolysiloxane dispersions of this invention contain the condensation catalyst (B) in amounts of preferably from 0.05 to 7 parts by weight, preferably from 0.1 to 2.0 parts by weight, per 100 parts by weight of organopolysiloxane (A) containing groups which can undergo condensation.

The organopolysiloxane resin (C) employed in this invention is preferably one having units of the general formula $$R^2{}_a SiO_{\frac{4-a}{2}} \qquad (II)$$

where $R^2$ is the same as $R^1$ and a is a number having an average value of from 0.5 to 1.95 and more preferably from 0.8 to 1.8.

Although not shown in formula (II), the organopolysiloxane resin can contain up to 10 percent by weight of Si-bonded hydroxyl groups and/or alkoxy groups.

Preferred radicals represented by $R^2$ in formula (II) are methyl, ethyl, vinyl and phenyl radicals, and more preferably $R^2$ in formula (II) are methyl, ethyl, vinyl and phenyl radicals, and more preferably $R^2$ is a methyl radical.

The molecular weight of the organopolysiloxane resin (C) employed in this invention is preferably more than 500, and more preferably more than 2000.

The organopolysiloxane resin (C) employed in this invention can be prepared by processes which are known in the art, such as, for example, by condensation of low molecular weight organopolysiloxane resins in dispersion. Also, it is possible for the low molecular weight organopolysiloxane resins to be prepared by solvolysis and condensation from a solution of the corresponding silanes having Si-bonded chlorine atoms in a water-immiscible solvent by means of an alcohol/water mixture. Reference may be made here, for example, to W. Noll, "Chemistry and Technology of Silicones"; Academic Press, Orlando, 1968, pages 190 to 208.

The organopolysiloxane resin (C) employed in this invention can be a single type or a mixture of at least two types of such organopolysiloxane resins.

The aqueous organopolysiloxane dispersions of this invention contain the organopolysiloxane resin (C) in amounts of preferably from 1 to 100 parts by weight and more preferably from 5 to 35 parts by weight, per 100 parts by weight of organopolysiloxane (A) containing groups which can undergo condensation.

The diorganosilanolate (D) employed in this invention preferably has the formula $$R^3{}_2 Si(OM)_m(OH)_{2-m} \qquad (III)$$

and/or condensation products thereof formed by splitting off water, wherein $R^3$ can be the same or different and is the same as $R^1$, M represents an alkali metal cation or an ammonium or phosphonium group and m is an integer or fraction having a value of from 0.1 to 2.

Preferred radicals represented by $R^3$ in formula (III) are optionally halogenated or amine-containing hydrocarbon radicals having from 1 to 10 carbon atom(s), and more preferably a hydrocarbon radical having from 1 to 6 carbon atoms(s) or an aminoalkyl radical.

Examples of $R^3$ radicals are the radicals mentioned above as examples of the $R^1$ radicals.

Examples of preferred radicals $R^3$ are the radicals mentioned above as examples of hydrocarbon radicals $R^1$, with the exception of the dodecyl, octadecyl, naphthyl and biphenylyl radicals, halogenated radicals, such as 3,3,3-trifluoropropyl radical, hexafluoropropyl radicals, the 1-trifluoromethyl-2,2,2-trifluoroethyl radical, the 2-(perfluorohexyl)ethyl radical, the 3-chloropropyl radical and amino-substituted radicals.

Examples of more preferred radicals represented by $R^3$ are alkyl radicals, such as the methyl, ethyl, n-propyl, isopropyl, n-butyl, sec-butyl, t-butyl and n-hexyl radical, and other hexyl radicals; alkenyl radicals, such as the vinyl and the allyl radical and the phenyl radical, the N-(2-aminoethyl)-3-aminopropyl radical, the 3-aminopropyl radical and the 3-(cyclohexylamino)propyl radical.

The number m preferably has a value of from 0.5 to 2, and more preferably 1 to 2.

Examples of radicals represented by M are the cations of the alkali metals, such as those of lithium, sodium, potassium, rubidium and cesium, and radicals of the formula $$+NR^4{}_4 \qquad (IV)$$

or $$+PR^4{}_4 \qquad (V)$$

wherein $R^4$ is the same or different and represents a hydrocarbon radical having from 1 to 6 carbon atom(s).

Preferred radicals represented by M are $Na^+$, $K^+$ and ammonium radicals of formula (IV).

Examples of the diorganosilanolate (D) employed in this invention are the potassium salts of dimethylsilanediol and of N-(2-aminoethyl)-3-aminopropylmethylsilanediol.

The diorganosilanolate (D) employed in this invention can be a single type or a mixture of at least two types of such diorganosilanolates.

The aqueous organopolysiloxane dispersions of this invention contain the diorganosilanolate (D) in amounts of from 0.01 to 10 parts by weight, and more preferably from 0.15 to 7 parts by weight, per 100 parts by weight of organopolysiloxane (A) containing groups which can undergo condensation.

The aqueous organopolysiloxane dispersions of this invention are in general stabilized by emulsifiers. Cationic, anionic, ampholytic and nonionic emulsifiers can be used. These emulsifiers and manufacturing thereof are well known to those skilled in the art. One type of emulsifier, for example, an anionic emulsifier, or mixtures of at least two types of emulsifiers can be used, for example, a mixture of at least one anionic and at least one nonionic emulsifier.

The emulsifiers can be added as such to the mixture to be dispersed or the mixture to be stabilized as a dispersion, and they can also be formed in the mixture to be dispersed or the mixture to be stabilized as a dispersion by chemical reaction(s) from a precursor, for example, the corresponding acid or base or a salt of the actual emulsifier.

The anionic emulsifiers are preferably the salts of the surface-active sulphonic acids described in U.S. Pat. No. 3,294,725 (D. E. Findley, Dow Corning Corporation; published on 27th Dec. 1966), where the surface-active sulphonic acids and salts thereof are described. These anionic emulsifiers are employed in the emulsion polymerization to form the organopolysiloxane (A) containing groups which can undergo condensation. The alkali metal salts or ammonium salts of the sulphonic acids are preferred, in particular the potassium salts.

Examples of sulphonic acids are aliphatic substituted benzenesulphonic acids, naphthalenesulphonic acids containing aliphatic substituents, aliphatic sulphonic acids, silylaklylsulphonic acids and diphenyl ethersulphonic acids containing aliphatic substituents.

Alkali metal sulphoricinoleates, sulphonated glycerol esters of fatty acids, salts of sulphonated monofunctional alcohol esters, amides of aminosulphonic acids, such as, for example, the sodium salt of oleyl methyltauride, alkali metal salts of sulphonated aromatic hydrocarbons, such as sodium α-naphthalene-monosulphonate, and condensation products of naphthalene-sulphonic acids with formaldehyde and sulphates, such as ammonium lauryl sulphate, triethanolamine lauryl sulphate and sodium lauryl ethersulphate, can be used as anionic emulsifying agents.

Nonionic emulsifiers are preferably used in addition to the anionic emulsifiers. Examples of such nonionic emulsifiers are saponins, addition products of fatty acids with ethylene oxide, such as dodecanoic acid esters with tetraethylene oxide, addition products of ethylene oxide with sorbitan trioleate, addition products of phenolic compounds having side chains with ethylene oxide, such as addition products of ethylene oxide with isodidecylphenol, and imine derivatives, such as polymerized ethyleneimine, and addition products of alcohols with ethylene oxide, such as polyethylene glycol (10)-isotridecyl ether.

Examples of cationic emulsifiers are fatty amines, quaternary ammonium compounds and quaternary compounds of pyridine, morpholine and imidazoline.

Examples of ampholytic emulsifiers are long-chain substituted aminoacids, such as N-alkyl-di-(aminoethyl)glycine and N-alkyl-2-aminopropionate, as well as the betaines, such as (3-acylaminopropyl)-dimethylglycine and alkylimid-azoliumbetaines.

The amount of emulsifier which is necessary for stabilizing the aqueous organopolysiloxane dispersions of this invention depends greatly on the composition of the particular dispersion. In general from 0.5 to 10 percent by weight of emulsifier(s) per 100 parts by weight of organopolysiloxane (A) containing groups which can undergo condensation are sufficient.

Although it is not necessary, organosilanolates of the formula

$$R^3Si(OM)_r(OH)_{3-r} \qquad (VI)$$

and/or condensation products thereof formed by splitting off water, wherein $R^3$ and M are the same as above and r is an integer or fraction having a value of from 0.1 to 3, preferably from 0.5 to 3 and more preferably from 1 to 3, can also be used in the aqueous organopolysiloxane dispersions of this invention.

The organopolysiloxane dispersions of this invention can contain an organosilanolate of formula (VI) in an amount of from 0 to 10 parts by weight, and more preferably from 0 to 4 parts by weight, per 100 parts by weight of organopolysiloxane (A) containing groups which can undergo condensation.

The aqueous organopolysiloxane dispersions of this invention can also contain other components, preferably selected from the group consisting of fillers, adhesion promoters, plasticizers, foam suppressants, thixotropic and dispersing agents, pigments, soluble dyestuffs, fungicides, perfumes and organic solvents which are inert with respect to the dispersions.

Examples of fillers are non-reinforcing fillers, that is, fillers having a BET surface area of up to 50 $m^2/g$, such as quartz, diatomaceous earth , calcium silicate, zirconium silicate, zeolites, metal oxide powders, such as aluminum oxides, titanium oxides, iron oxides or zinc oxides or mixed oxides thereof, barium sulphate, calcium carbonate, gypsum, silicon nitride, silicon carbide, boron nitride, glass powders and powders of plastics; reinforcing fillers, that is, fillers having a BET surface area of more than 50 $m^2/g$, such as pyrogenically prepared silicic acid, precipitated silicic acid, carbon black, such as furnace black and acetylene black, and silicon-aluminum mixed oxides of high BET surface area; and fibrous fillers, such as asbestos and fibers of plastics. The fillers may be rendered hydrophobic, for example, by treatment with organosilanes or -siloxanes, or by etherification of hydroxyl groups to alkoxy groups.

Fillers are used in an amount of preferably from 0 to 200 parts by weight per 100 parts by weight of organopolysiloxane (A) containing groups which can undergo condensation.

Examples of adhesion promoters which can be added to improve the adhesion of the elastomeric products obtained from the aqueous dispersions of this invention, after removal of their solvent, to the substrate to which the dispersions of this invention have been applied are silanes containing amino functions, such as N-(2-aminoethyl)-3-aminopropyltrialkoxysilanes, in which the alkoxy radical is a methoxy, ethoxy, n-propoxy or isopropoxy radical.

Examples of plasticizers are dimethylpolysiloxanes which are liquid at room temperature, blocked by trimethylsiloxy end groups and have a viscosity of at least 10 mPa.s.

Examples of organic solvents which are inert with respect to the dispersions are hydrocarbons, such as petroleum ether of various boiling ranges, n-pentane, n-hexane, a hexane isomer mixture, toluene and xylene.

Examples of thixotropic agents are carboxymethylcellulose and polyvinyl alcohol.

Examples of dispersing agents are polyacrylic acid salts and polyphosphates.

The thixotropic and dispersing agents have, in some cases, emulsifying properties so they can be used as emulsifiers.

Of each of the groups of substances mentioned above as possible components of the aqueous dispersions of this invention, one substance of this group or a mixture of at least two of these substances which are different can be used as one component.

The aqueous organopolysiloxane dispersions of this invention preferably have a pH of 5 from to 13, and more preferably from 7 to 11.

Solids contents of more than 90 percent by weight have been obtained in the aqueous organopolysiloxane dispersions of this invention. Solids content is to be understood as meaning the proportion by weight of all the constituents of the dispersion, excluding water and organic solvent, if used, of the total weight of the dispersion. The aqueous organopolysiloxane dispersions of this invention preferably have solids contents of from 20 to 90 percent by weight, and more preferably from 40 to 90 percent by weight. Lower solids contents are of course possible, but are not as economical.

The aqueous organopolysiloxane dispersions of this invention can be prepared in the same manner in which aqueous dispersions of organopolysiloxanes have been or could have been prepared heretofore.

The preferred procedure for preparing the aqueous dispersions of this invention comprises mixing an aqueous emulsion of polyorganosiloxane (A) containing groups which can undergo condensation; a condensation catalyst (B) in bulk or in the form of an aqueous dispersion; an aqueous dispersion of an organopolysiloxane resin (C); a diorganosilanolate (D) and the corresponding condensation products formed by splitting off water; and, if appropriate, with other substances.

The emulsification or dispersion can be carried out in conventional mixing apparatuses which are suitable for preparing emulsions or dispersions, such as, for example, high-speed stator-rotor stirred apparatuses according to Prof. P. Willems, known by the registered trademark "UltraTurrax". Reference may also be made here to Ullmanns Encyklopädie der Technischen Chemie (Ullmann's Encyclopaedia of Industrial Chemistry), Urban & Schwarzenberg, Munich, Berlin, 3rd edition, volume 1, page 720 et seq.

A particularly preferred procedure for preparing the aqueous dispersions of this invention is as follows: An acid emulsion of organopolysiloxane (A) containing groups which can undergo condensation, which is prepared by emulsifying, and then subjecting to a high degree of condensation in emulsion, low molecular weight cyclic or linear organopolysiloxanes blocked by hydroxyl and/or alkoxy end groups, having a viscosity of preferably between 80 and 100,000 mPa.s in the presence of an acid condensation catalyst and emulsifier; is mixed with a basic dispersion of organopolysiloxane resin (C), which is prepared by dispersing, and subjecting to a high degree of condensation in dispersion, low molecular weight organopolysiloxane resins, having a molecular weight of preferably between 200 and 10,000, in the presence of a basic condensation catalyst and emulsifier; in which the pH of the emulsion (A) and the dispersion (C) is chosen so that the resulting mixture is neutral; and condensation catalyst (B), in bulk or in the form of an aqueous dispersion; diorganosilanolate (D) and the corresponding condensation products formed by splitting off water, preferably as a mixture with water, and if appropriate with other substances.

The aqueous organopolysiloxane dispersions of this invention can be employed for all purposes for which aqueous dispersions of organopolysiloxanes have been or could have been used heretofore. They can be used, for example, as sealing compositions, paints and paint systems and as electrically insulating or conductive, hydrophobic coating systems which repel adhesive substances, or as a base or additive to such systems.

The aqueous organopolysiloxane dispersions prepared according to this invention, particularly by those prepared by the preferred embodiment of this invention, harden at room temperature within a short time, after evaporation of the solvent, water and if appropriate organic solvents, to form elastomers.

The mechanical properties of the elastomeric products produced according to the invention can be adjusted in a controlled and relatively simple manner according to the requirements imposed via the proportion of diorganosilanolate (D) in the aqueous dispersion of this invention, for example, by addition of different amounts of diorganosilanolate (D), to give a pre-prepared base composition containing the other components.

The aqueous dispersions of this invention have the further advantage that they form firmly adhering coatings on many substrates, such as, for example, paper, textiles, mineral building materials, plastics, wood and many other substrates. Coating can be carried out, for example, by brushing, rolling dipping or spraying.

In the following examples, all the parts and percentages are by weight, unless otherwise specified. All the viscosity data relate to a temperature of 25° C. Unless indicated otherwise, the following examples were carried out under a pressure of the surrounding atmosphere, that is at about 1000 hPa, and at room temperature, that is at about 22° C., or at a temperature which is established, without additional heating or cooling, when the reactants are mixed together at room temperature.

The elastomer properties are in each case determined by the following standard procedures:

| Tear strength: | DIN 535 4-85S1 |
| Elongation at break: | DIN 53504-85S1 |
| Modulus: | DIN 53504-85S1 |
| Shore A hardness: | DIN 53505-87 |
| Tear propagation resistance: | ASTM D624B-73 |

EXAMPLE 1

(I) Preparation of an aqueous emulsion of organopolysiloxane (A) containing groups which can undergo condensation An emulsion prepared from 1700 g of an $\alpha,\omega$-dihydroxydimethylsiloxane having a viscosity of 100 mm$^2$/s, 53.0 g of potassium dodecylbenzenesulphonate (65 percent in water), 34.3 g of dodecylbenzenesulphonic acid and 213 g of water is stored for 20 hours and neutralized with potassium hydroxide (44 percent in water). The viscosity of the oily
phase is 1,000,000 mm$^2$/s.

(II) Preparation of an aqueous dispersion of condensation catalyst (B)

About 50.0 g of dibutyltin dilaurate are emulsified together with 5.00 g of potassium dodecylbenzenesulphonate and 45 g of water.

(III) Preparation of an aqueous dispersion of organopolysiloxane resin (C)

A dispersion prepared from 300 g of a low molecular weight organopolysiloxane resin consisting of units of the formula $$(CH_3)_{1.2}SiO_{1.4}.$$

24.0 g of potassium dodecylbenzenesulphonate (65 percent in water), 9.00 g of dodecylbenzenesulphonic acid and 267 g of water is stored for 36 hours and neutralized with potassium hydroxide (44 percent in water). The dispersion is milky-cloudy and forms a brittle film after drying on a glass plate.

(IV) Preparation of an aqueous solution of potassium N(2-aminoethyl)-3-aminopropylmethysilanolate About 103 g of N-(2-aminoethyl)-3-aminopropylmethyldimethoxysilane (commercially available under the name "Silan GF 95" from Wacker-Chemie GmbH, Munich) are metered into a solution containing 63.7 g of potassium hydroxide (88 percent in water) in 200 g of water, with vigorous stirring. First methanol and then about 70 g of water are distilled off from the mixture, by heating. The mixture is then made up to a total weight of 317 g by addition of water. A 40 percent potassium N-(2-aminoethyl)-3-aminopropylmethylsilanolate solution is obtained.

(V) Preparation of an aqueous solution of potassium N-(2-aminoethyl)-3-aminopropylsilanolate About 111 g of N-(2-aminoethyl)-3-aminopropyltrimethoxysilane (commercially available under the name "Silan GF 91" from Wacker-Chemie GmbH, Munich) are metered into a solution containing 95.g of potassium hydroxide in 400 g of water, with vigorous stirring. First methanol and then about 200 g of water are distilled off from the mixture by heating. The mixture is then made up to a total weight of 367 g by addition of water. A 40 percent potassium N-(2-aminoe-thyl)- 3-aminopropylsilanolate solution is obtained.

About 100 g of the polymer emulsion prepared in (I) are mixed with 1.00 g of the catalyst dispersion prepared in (II), 15.0 g of the resin dispersion prepared in (III) and 0.0 g of precipitated chalk to form a creamy, stable composition which can be stored for at least 6 months. In each case, different amounts of the potassium N-(2-aminoethyl)-3-aminopropylmethylsilanolate prepared in (IV) or mixtures with the potassium N-(2-aminoethyl)-3-aminopropylsilanolate prepared in (V) are now stirred into equal amounts of this basic composition (see Table 1).

TABLE 1

| Experiment | Basic Composition (g) | Diorganosilanolate according to (IV) in (g) | Organosilanolate according to (V) in (g) | pH |
|---|---|---|---|---|
| 1a | 176 | 0.5 | — | 8.5 |
| 1b | 176 | 1.0 | — | 8.5 |
| 1c | 176 | 1.5 | — | 9.0 |
| 1d | 176 | 2.0 | — | 9.0 |
| 1e | 176 | 3.0 | — | 10.0 |
| 1f | 176 | 1.0 | 0.5 | 9.0 |
| 1g | 176 | 1.0 | 1.0 | 10.0 |

About 24 hours after preparation of the aqueous dispersions of these Experiments 1a to 1g, films 2 mm thick are produced from them by applying each of the aqueous dispersions 1a to 1g to a polytetrafluoroethylene (PTFE) surface and the water allowed to evaporate at room temperature. Two weeks after the application, dry, elastic films are formed and are analyzed for their elastomeric properties (see Table 2).

TABLE 2

| experiment | Tear strength (N/mm$^2$) | Elongation at break (%) | Modulus[1] (N/mm$^2$) | Shore A Hardness | Tear propagation Resistance (N/mm) |
|---|---|---|---|---|---|
| 1a | 0.9 | 660 | 0.4 | 23 | 4.6 |
| 1b | 0.9 | 740 | 0.3 | 19 | 4.8 |
| 1c | 1.0 | 750 | 0.3 | 20 | 5.2 |
| 1d | 1.1 | 830 | 0.3 | 21 | 5.3 |
| 1e | 0.7 | 400 | 0.3 | 22 | 4.5 |
| 1f | 1.1 | 690 | 0.3 | 21 | 4.7 |
| 1g | 0.7 | 320 | 0.5 | 23 | 5.5 |
| V1a | 0.7 | 650 | 0.3 | 16 | 2.7 |
| V1b | 0.6 | 440 | 0.3 | 19 | 3.7 |
| V1c | 0.4 | 210 | 0.3 | 18 | 3.5 |
| 2 | 1.3 | 720 | 0.5 | 29 | 6.4 |

[1]Tensile strength at 100 percent elongation.

COMPARISON EXAMPLE 1

The procedure described in Example 1 is repeated, except that no silanolate or different amounts of the potassium N-(2-aminoethyl)-3-aminopropylsilanolate prepared in (V) of Example 1 are stirred into the same amounts of basic composition (see Table 3). Creamy, stable compositions are obtained which can be stored for at least 6 months.

TABLE 3

| Experiment | Basic Composition (g) | Diorganosilanolate according to (IV) in (g) | Organosilanolate according to (V) in (g) | pH |
|---|---|---|---|---|
| V1a | 176 | — | — | 9.5[2] |
| V1b | 176 | — | 1.0 | 9.0 |
| V1c | 176 | — | 2.0 | 9.0 |

[2]The pH is adjusted by addition of 1 g of potassium hydroxide (20 percent in water).

About 24 hours after preparation of the aqueous dispersions according to Experiments V1a to V1c, films 2 mm thick are produced by applying each of the aqueous dispersions V1a to V1c to a polytetrafluroethylene surface and allowing the water to evaporate at room temperature. Two weeks after the application, dry, elastic films form, and are analyzed for their elastomeric properties. The results are shown in Table 2 of Example 1.

EXAMPLE 2

About 100 g of the polymer emulsion prepared in (I) of Example 1 are mixed with 1.00 g of the catalyst dispersions prepared in (II) of Example 1, 30.0 g of the resin dispersion prepared in (III) of Example 1 and 60.0 g of precipitated chalk to form a creamy, stable composition which can be stored for at least 6 months. About 2.0 g of the potassium N-(2-aminoethyl)-3-aminopropylmethylsilanolate prepared in (IV) of Example 1 are stirred into 191 g of this basic composition. The aqueous dispersion thus prepared has a pH of 9.0.

About 24 hours after preparation of the aqueous dispersion thus obtained, a 2 mm thick film is produced from it by applying the aqueous dispersion to a PTFE surface and the water allowed to evaporate at room temperature Two weeks after the application, a dry, elastic film forms, and is analyzed for its elastomeric properties. The results of this analysis are found in Table 2 of Example 1.

EXAMPLE 3:

(VI) Preparation of an aqueous emulsion of organopolysiloxane (A) containing groups which can undergo condensation An emulsion prepared from 850 g of an α,w-dihydroxydimethylsiloxane having a viscosity of 80,000 mm$^2$/s, 6.5 g of potassium dodecylbenzenesulphonate (65 percent in water), 17.2 g of dodecylbenzenesulphonic acid and 106 g of water is stored for 4 hours and processed further without neutralization. The viscosity of the oily phase is 420,000 mm$^2$/s.

(VII) Preparation of an aqueous dispersion of organopolysiloxane resin (C)

A dispersion prepared from 150 g of a low molecular weight organopolysiloxane resin consisting of units of the formula

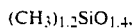

$(CH_3)_{1.2}SiO_{1.4}$.

12.0 g of potassium dodecylbenzenesulphonate (65 percent in water), 12.00 g of the potassium N-(2-aminoethyl)-3-aminopropylmethylsilanolate prepared in (IV) of Example 1 and 138 g of water is stored for 6 hours (80° C.) or 48 hours and processed further without prior neutralization. Regardless of the storage time, the dispersions are milky-cloudy and form a brittle film after drying on a glass plate.

In each case 100 g of the polymer emulsion prepared in (VI) are mixed thoroughly with 25.0 g of the resin dispersion prepared in (VII) and stored for different periods of time, so that a neutral, highly viscous dispersion is formed, 0.50 g of the catalyst dispersion prepared in (II) of Example 1, 1.00 g of N-(2-aminoethyl)-3-aminopropyltrimethoxysilane (commercially available under the name "Silan GF 91" from Wacker-Chemie GmbH, Munich) and 70.0 g of precipitated chalk are added, to form a creamy, stable composition which can be stored for at least 6 months. Different amount of the potassium N-(2-aminoethyl)-3-aminopropylmethylsilanolate prepared in (IV) of Example 1 are now stirred into the same amounts of these basic compositions (see Table 4).

TABLE 4

| Experiment | Basic Composition (g) | Diorgano-silanolate according to (IV) in (g) | Storage time of the resin dispersion according to (VII) | pH |
|---|---|---|---|---|
| 3a | 196.5 | 1.0 | 6 hours (80° C.) | 9.0 |
| 3b | 196.5 | 2.0 | 6 hours (80° C.) | 9.5 |
| 3c | 196.5 | 1.0 | 48 hours | 9.0 |

About 24 hours and 4 and 14 days after preparation of the aqueous dispersions according to Experiments 3a to 3c, films 2 mm thick are produced by applying each of the aqueous dispersions 3a to 3c to a PTFE surface and allowing the water to evaporate at room temperature. After the times shown in Table 5, dry, elastic films are formed and are analyzed for their elastomeric properties (see Table 6).

TABLE 5

| Experiment | Storage time of the dispersions before their use. | Time until the film is free from tackiness. |
|---|---|---|
| 3a | 24 hours | 120 minutes |
| 3a | 96 hours | 25 minutes |
| 3a | 336 hours | 20 minutes |
| 3b | 24 hours | 80 minutes |
| 3b | 96 hours | 17 minutes |
| 3b | 336 hours | 15 minutes |
| 3c | 24 hours | 120 minutes |
| 3c | 96 hours | 20 minutes |
| 3c | 336 hours | 20 minutes |
| 4 | 24 hours | 1440 minutes |
| 4 | 96 hours | 240 minutes |
| 4 | 336 hours | 40 minutes |

TABLE 6

| Experiment | Tear Strength (N/mm$^2$) | Elongation at Break (%) | Modulus[1] (N/mm$^2$) | Shore A Hardness | Tear Propagation Resistance (N/mm) |
|---|---|---|---|---|---|
| 3a | 0.9 | 1020 | 0.3 | 21 | 5.3 |
| 3b | 0.9 | 700 | 0.4 | 23 | 5.9 |
| 3c | 1.0 | 810 | 0.4 | 22 | 5.5 |
| V2a | 1.0 | 650 | 0.5 | 28 | 6.2 |
| V2b | 1.0 | 410 | 0.5 | 30 | 6.7 |
| V2c | 0.9 | 430 | 0.5 | 31 | 6.6 |
| 4 | 0.9 | 570 | 0.3 | 25 | 4.6 |

[1]Tensile strength at 100 percent elongation.

COMPARISON EXAMPLE 2

(VIII) Preparation of an aqueous dispersion of organopolysiloxane resin (C)

The procedure described in (VII) of Example 3 is repeated with the exception that instead of 12.00 g of the potassium N-(2-aminoethyl)-3-aminopropylmethylsilanolate prepared in (IV) of Example 1, 12.00 g of the potassium N-(2-aminoethyl)-3-aminopropylsilanolate prepared in (V) of Example 1 are used. Regardless of the storage time, the dispersions are milky-cloudy and form a brittle film after drying on a glass plate.

In each case, 100 g of the polymer emulsion prepared in (VI) of Example 3 are mixed thoroughly with 25.0 g of the resin dispersion prepared in (VIII) and stored for different periods of time so that a neutral, highly viscous dispersion is formed, and 0.50 g of the catalyst dispersion prepared in (II) of Example I, 1.00 g of N-(2-aminoethyl)-3-aminopropyltrimethoxysilane (commercially available under the name "Silan GF 91" from Wacker-Chemie GmbH, Munich) and 70.0 g of precipitated chalk are added to form a creamy, stable composition which can be stored for at least 6 months. Different amounts of the potassium N-(2-aminoethyl)-3-aminopropylsilanolate prepared in (V) of Example 1 are now stirred into the same amount of these basic compositions (see Table 7).

TABLE 7

| Experiment | Basic Composition (g) | Diorgano-silanolate according to (V) in (g) | Storage time of the resin dispersion according to (VIII) | pH |
|---|---|---|---|---|
| V2a | 196.5 | 1.0 | 6 hours (80° C.) | 9.0 |
| V2b | 196.5 | 2.0 | 6 hours (80° C.) | 9.0 |
| V2c | 196.5 | 1.0 | 48 hours | 9.0 |

The procedure described in Example 3 is repeated with the aqueous dispersions according to Experiments V2a to V2b. The times required until absence of tackiness if obtained can be seen from Table 8 and the elastomeric properties can be seen from Table 6 of Example 3.

TABLE 8

| Experiment | Storage time of the dispersions before their use. | Time until absence of tackiness of the film. |
|---|---|---|
| V2a | 24 hours | 90 minutes |
| V2a | 96 hours | 18 minutes |
| V2a | 336 hours | 13 minutes |
| V2b | 24 hours | 60 minutes |
| V2b | 96 hours | 10 minutes |
| V2b | 336 hours | 10 minutes |
| V2c | 24 hours | 100 minutes |
| V2c | 96 hours | 18 minutes |
| V2c | 336 hours | 17 minutes |

EXAMPLE 4

(IX) Preparation of an aqueous emulsion of organopolysiloxane (A) containing groups which can undergo condensation The procedure described in (VI) of Example 3 is repeated, except that neutralization is carried out with 9.00 g of potassium N-(2-aminoethyl)-3-aminopropylmethylsilanolate after storage for 4 hours. The viscosity of the oily phase is 400,000 mm²/s.

(X) Preparation of an aqueous dispersion of organopolysiloxane resin (C)

The procedure described in (VII) of Example 3 is repeated, except that instead of 12.00 g of the potassium N-(2-aminoethyl)-3-aminopropylmethylsilanolate prepared in (IV) of Example I, 3.00 g of dodecylbenzenesulphonic acid are used and neutralization with potassium hydroxide (20 percent in water) is carried out after storage for 48 hours. The dispersion is milky-cloudy and forms a brittle film after drying on a glass plate.

About 100 g of the polymer emulsion described in (IX) are mixed thoroughly with 25.0 g of the resin dispersion prepared in (X), 0.50 g of the catalyst dispersion prepared in (II) of Example 1, 1.00 g of N-(2-aminoethyl)-3-aminopropyltrimethoxysilane (commercially available under the name "Silan GF 91" from Wacker-Chemie GmbH, Munich), 70.0 g of precipitated chalk and 1.00 g of potassium N-(2-aminoethyl-3-aminopropylmethylsilanolate are added to form a creamy, stable composition which can be stored for at least 6 months and has a pH of 9.0.

The procedure described in Example 3 is repeated with the aqueous dispersion thus obtained. The times until absence of tackiness is achieved can be seen from Table 5 of Example 3 and the elastomeric properties can be seen from Table 6 of Example 3.

What is claimed is:

1. An aqueous dispersion of organopolysiloxanes comprising: (A) An organopolysiloxane containing groups which can undergo condensation; (B) a condensation catalyst; (C) an organopolysiloxane resin; and (D) a diorganosilanolate and/or condensation products thereof formed by splitting off water.

2. The aqueous dispersion of claim 1, wherein that the organopolysiloxane (A) containing groups which can undergo condensation has the formula $$RO-[SiR^1_2O]_n-R \quad (I).$$

wherein R is selected from the group consisting of a hydrogen atom or alkyl radical having from 1 to 6 carbon atoms(s), $R^1$ is selected from the group consisting of hydrocarbon radicals having from 1 to 18 carbon atom(s), and substituted hydrocarbon radicals having from 1 to 18 carbon atom(s) which are substituted with a group selected from the group consisting of a halogen atom, an amino group, an ether group, an ester group, an epoxy group, a mercapto group, a cyano group and a (poly)glycol radical, in which the (poly)glycol radical contains units selected from the group consisting of oxyethylene units, oxypropylene units, and mixtures thereof and n is an integer of at least 200.

3. The aqueous dispersion of claim 1, wherein the condensation catalyst (B) is an (organo)metallic compound.

4. The aqueous dispersions of claim 2, wherein the condensation catalyst (B) is an (organo)metallic compound.

5. The aqueous dispersion of claim 1, wherein the organopolysiloxane resin (C) contains units of the formula $$R^2_a SiO_{\frac{4-a}{2}} \quad (II)$$

wherein $R^2$ is selected from the group consisting of hydrocarbon radicals having from 1 to 18 carbon atom(s), and substituted hydrocarbon radicals having from 1 to 18 carbon atom(s) which are substituted with a group selected from the group consisting of a halogen atom, an amino group, an ether group, an ester group, an epoxy group, a mercapto group, a cyano group, and a (poly)glycol radical, in which the (poly)glycol radical contains units selected from the group consisting of oxyethylene units, oxypropylene units, and mixtures thereof and a is a number having an average value of from 0.5 to 1.95.

6. The aqueous dispersion of claim 2, wherein the organopolysiloxane resin (C) contains units of the formula $$R^2_a SiO_{\frac{4-a}{2}} \quad (II)$$

wherein $R^2$ is selected from the group consisting of hydrocarbon radicals having from 1 to 18 carbon atom(s), and substituted hydrocarbon radicals having from 1 to 18 carbon atom(s) which are substituted with at least one member selected from the group consisting of a halogen atom, an amino group, an ether group, an ester group, an epoxy group, a mercapto group, a cyano group, and a (poly)glycol radical, in which the (poly)glycol radical contains units selected from the group consisting of oxyethylene units, oxypropylene units, and mixtures thereof and a is a number having an average value of from 0.5 to 1.95.

7. The aqueous dispersion of claim 3, wherein the organopolysiloxane resin (C) contains units of the formula $$R^2{}_a SiO_{\frac{4-a}{2}}, \qquad (II)$$

wherein $R^2$ is selected from the group consisting of hydrocarbon radicals having from 1 to 18 carbon atom(s), and substituted hydrocarbon radicals having from 1 to 18 carbon atom(s) which are substituted with a moiety selected from the group consisting of a halogen atom, an amino group, an ether group, an ester group, an epoxy group, a mercapto group, a cyano group, and a (poly)glycol radical, in which the (poly)glycol radical contains units selected from the group consisting of oxyethylene units, oxypropylene units, and mixtures thereof and a is a number having an average value of from 0.5 to 1.95.

8. The aqueous dispersion of claim 1, wherein the diorganosilanolate (D) has the formula $$R^3{}_2 Si(OM)_m(OH)_{2-m} \qquad (III)$$

and/or condensation products thereof formed by splitting off water, wherein $R^3$ is selected from the group consisting of hydrocarbon radicals having from 1 to 18 carbon atom(s) and substituted hydrocarbon radicals having from 1 to 18 carbon atom(s), which are substituted with a moiety selected from the group consisting of a halogen atom, an amino group, an ether group, an ester group, an epoxy group, a mercapto group, a cyano group and a (poly)glycol radical, in which the (poly)glycol radical contains units selected from the group consisting of oxyethylene units, oxypropylene units, and mixtures thereof, M is selected from the group consisting of an alkali metal cation, an ammonium group and a phosphonium group and m is an integer or fraction having a value of from 0.1 to 2.

9. The aqueous dispersion of claim 2, wherein the diorganosilanolate (D) has the formula $$R^3{}_2 Si(OM)_m(OH)_{2-m} \qquad (III)$$

and/or condensation products thereof formed by splitting off water, wherein R3 is selected from the group consisting of hydrocarbon radicals having from 1 to 18 carbon atom(s) and substituted hydrocarbon radicals having from 1 to 18 carbon atom(s), which are substituted with a moiety selected from the group consisting of a halogen atom, an amino group, an ether group, an ester group, an epoxy group, a mercapto group, a cyano group and a (poly)glycol radical, in which the (poly)glycol radical contains units selected from the group consisting of oxyethylene units, oxypropylene units, and mixtures thereof, M is selected from the group consisting of an alkali metal cation, an ammonium group and a phosphonium group and m is an integer or fraction having a value of from 0.1 to 2.

10. The aqueous dispersion of claim 3, wherein the diorganosilanolate (D) has the formula $$R^3{}_2 Si(OM)_m(OH)_{2-m} \qquad (III)$$

and/or condensation products thereof formed by splitting off water, wherein R3 is selected from the group consisting of hydrocarbon radicals having from 1 to 18 carbon atom(s) and substituted hydrocarbon radicals having from 1 to 18 carbon atom(s), which are substituted with a moiety selected from the group consisting of a halogen atom, an amino group, an ether group, an ester group, an epoxy group, a mercapto group, a cyano group and a (poly)glycol radical, in which the (poly)glycol radical contains units selected from the group consisting of oxyethylene units, oxypropylene units, and mixtures thereof, M is selected from the group consisting of an alkali metal cation, an ammonium group and a phosphonium group and m is an integer or fraction having a value of from 0.1 to 2.

11. The aqueous dispersion of claim 5, wherein the diorganosilanolate (D) has the formula $$R^3{}_2 Si(OM)_m(OH)_{2-m} \qquad (III)$$

and/or condensation products thereof formed by splitting off water, wherein $R^3$ is selected from the group consisting of hydrocarbon radicals having from 1 to 18 carbon atom(s) and substituted hydrocarbon radicals having from 1 to 18 carbon atom(s), which are substituted with a moiety selected from the group consisting of halogen, an amino group, an ether group, an ester group, an epoxy group, a mercapto group, a cyano group and a (poly)glycol radical, in which the (poly)glycol radical contains units selected from the group consisting of oxyethylene units, oxypropylene units, and mixtures thereof, M is selected from the group consisting of an alkali metal cation, an ammonium group and a phosphonium group and m is an integer or fraction having a value of from 0.1 to 2.

12. The aqueous dispersion of claim 1, wherein the dispersion contains 0.05 to 7 parts by weight of condensation catalyst (B), 1 to 100 parts by weight of organopolysiloxane resin (C) and 0.01 to 10 parts by weight of diorganosilanolate (D) per 100 parts by weight of organopolysiloxane (A) containing groups which can undergo condensation.

13. The aqueous dispersion of claim 1, wherein the dispersion has a pH of from 5 to 13.

14. The aqueous dispersion of claim 1, wherein it has a solids content of from 20 to 90 percent.

15. A process for preparing an aqueous dispersion of claim 1, which comprises: mixing an aqueous emulsion of polyorganosiloxane (A) containing groups which can undergo condensation; a condensation catalyst (B); an aqueous dispersion of organopolysiloxane resin (C); and a diorganosilanolate (D) and the corresponding condensation products formed by splitting off water.

16. The process of claim 15, wherein the condensation catalyst (B) is an aqueous dispersion.

17. The process of claim 15, which comprises: mixing an acid emulsion of organopolysiloxane (A) containing groups which can undergo condensation, which is obtained by emulsifying, and subjecting to a high degree of condensation in emulsion, low molecular weight organopolysiloxanes selected from the group consisting of cyclic organopolysiloxanes and linear organopolysiloxanes, endblocked by groups selected from the group consisting of hydroxyl groups, alkoxy groups and mixtures thereof in the presence of an acid condensation catalyst and an emulsifier with a basic dispersion of organopolysiloxane resin (C), which is obtained by dispersing, and subjecting to a high degree of condensation in dispersion, low molecular weight organopolysiloxane resins in the presence of a basic condensation catalyst and emulsifier, with the proviso that the pH of the emulsion (A) and the dispersion (C) is chosen so that the resulting mixture is about neutral, and then adding a condensation catalyst (B), and a diorganosilanolate (D) and the corresponding condensation products formed by splitting off water to the mixture of (A) and (C).

18. The process of claim 17, wherein the condensation catalyst (B) is an aqueous dispersion.

* * * * *

UNITED STATES PATENT AND TRADEMARK OFFICE
CERTIFICATE OF CORRECTION

PATENT NO. : 5,045,231
DATED : September 3, 1991
INVENTOR(S) : Rudolf Braun, Karl Braunsperger, Herbert Sollradl and Matthias Wolfgruber It is certified that error appears in the above-indentified patent and that said Letters Patent is hereby corrected as shown below:

In Example 1, column 9, line 65, after "(III) and"

delete "0.0 g" and insert in lieu of --- 60.0 g ---.

Signed and Sealed this

Eleventh Day of July, 1995

Attest:

BRUCE LEHMAN

Attesting Officer

Commissioner of Patents and Trademarks